March 13, 1962 W. J. WYATT 3,024,561
SIGNAL DEVICE FOR NIGHT FISHING
Filed Aug. 18, 1960
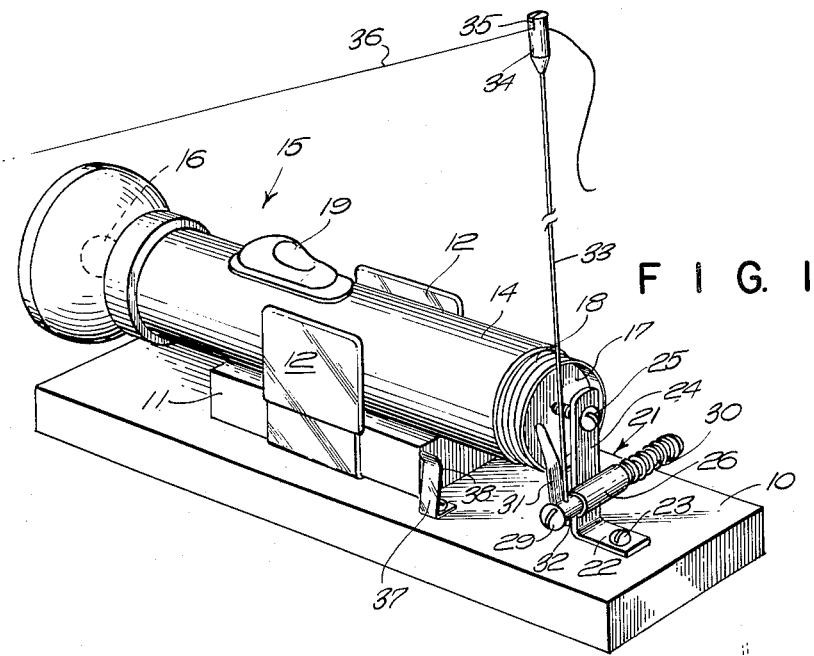
FIG. 1
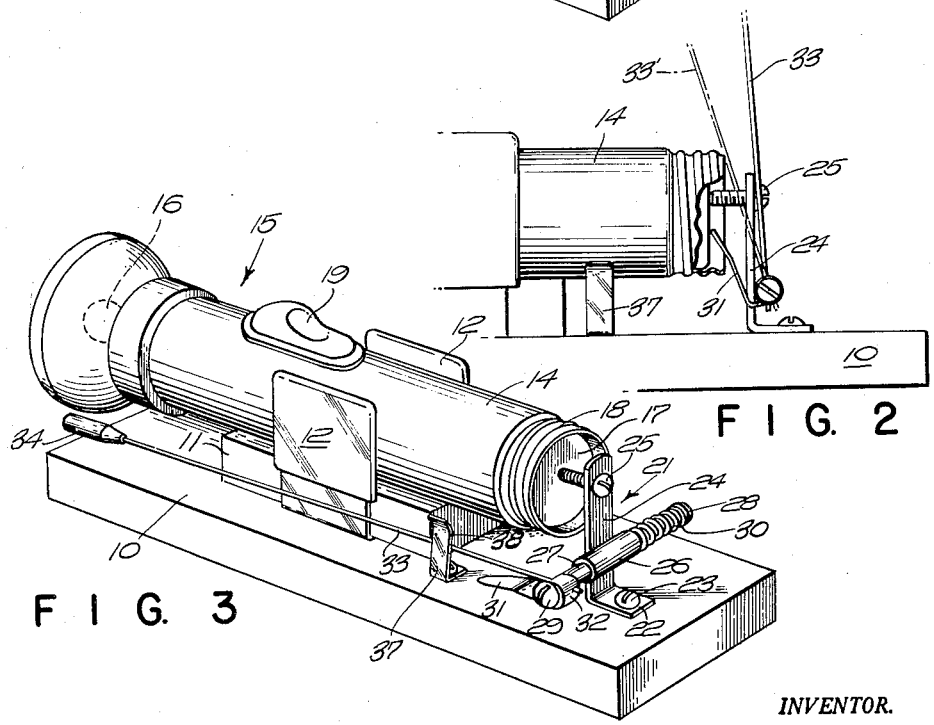
FIG. 2
FIG. 3
INVENTOR.
WILLIAM J. WYATT
BY
Barlow & Barlow
ATTORNEYS

United States Patent Office 3,024,561
Patented Mar. 13, 1962

3,024,561
SIGNAL DEVICE FOR NIGHT FISHING
William J. Wyatt, 84 South St., Plainville, Mass.
Filed Aug. 18, 1960, Ser. No. 50,424
5 Claims. (Cl. 43—17)

This invention relates to a device for use in connection with night fishing.

In fishing at night it is desirable to have some indication of when a fish takes the hook and is on the fishing line, which usually requires that a person have his hand on the line so that he may feel the pull of the line by reason of the fish tugging at it.

One of the objects of this invention is to provide a device which will light up when a fish tugs on the fishing line so that the fisherman although he does not have his hand on the line may be aware that he has a bite.

Another object of this invention is to provide a simple assembly to which the fishing line may be easily attached and which will light when a fish tugs at the fishing line attached to the device.

Another object of this invention is to provide an arrangement utilizing a usual form of flshlight for providing the battery, lamp, and circuits thereto leaving a simple mechanical construction for providing the electrical connection to complete the circuit.

Another object of this invention is to provide a unit which will be self-supporting by itself and which may be easily and quickly put into operation by attaching a fishing line into a part arranged to readily receive the same.

With these and other objects in view, the invention consists of certain novel features of construction as will be more fully described and particularly pointed out in the appended claims.

In the accompanying drawings:

FIGURE 1 is a perspective view of the device with a fishing line attached thereto and in operative position;

FIGURE 2 is a fragmental side elevation with parts broken away illustrating the means by which contact is made for lighting the lamp; and FIGURE 3 is a perspective view similar to FIGURE 1 but showing the part which engages the fishing line in retracted and stored position.

In proceeding with this invention I provide a U-shaped clip on some base between the arms of which a standard flashlight may be received, while at a location on the base at a point adjacent to the rear end of the flashlight I pivotally mount a rod which may receive the fishing line and I provide a resilient leaf spring which will engage an electrical contact end of the battery within the flashlight metal case and will hold the rod out of contact with the metal case. The rod however will either itself flex or the spring arm will flex so as to permit the rod to move into contact with the metal case when a pull is had on the fishing line so that by such contact a circuit is completed and the lamp of the flashlight will light.

With reference to the drawings 10 designates a base which may be of any suitable material such for instance as wood and 11 is a block thereon from either side of which resilient arms 12 extend upwardly having a space between them sufficient so that the cylindrical metal case 14 of a flashlight designated generally 15 may be inserted and resiliently gripped.

This flashlight 15 comprises a metal casing 14, a bulb or lamp 16, and a plurality of batteries, one of which is shown at 17, through the open threaded end 18 of the casing 14. A switch 19 normally provides for closing the circuit from the center terminal of the base of the lamp 16 through the batteries 17 and thence to the metal casing 14 through a spring in the end closure of the flashlight and then to the threaded socket which receives the threaded base of the lamp to complete the circuit. When the bottom or end closure through which the loading of the batteries is had is removed from the casing 14, the circuit is normally interrupted between the end of the batteries 17 and the casing 14, and I take advantage of this sort of construction in this invention and at this location interpose my control.

A bracket 21 has a foot portion 22 with a screw 23 to hold the bracket on the base 10 with the upstanding portion 24 extending to a height beyond the center of the battery 17 which is within the case 14. A screw 25 is threaded through the upstanding portion 24 so as to engage the terminal end of the batteries 17 and also provide an adjustable stop against which the flashlight and batteries may be positioned. A bearing 26 is carried by this upstanding portion 24 and rotatably mounts a pin 27 the opposite ends of which have threaded bores to receive screws having heads 28 and 29 to provide limiting stops at either end. A spring 30 encircles the pin 27 between the stop 28 and the end of the bearing 26 so as to slide the pin to the right as shown in FIGURES 1 and 2.

A resilient arm 31 is secured to the pin 27 such for instance as by coiling an end thereof about the pin as at 32, it being located close to the abutment formed by the head 29.

A resilient metallic rod 33 is secured to the pin 27 adjacent to spring arm 31 such for example as by passing the rod 33 into an opening and through the pin 27. This rod 33 extends upwardly when in working position, as shown in FIGURE 1, a sufficient distance and is equipped with a gripping device 34 which in this instance is indicated as being a resilient member with a slot 35 in its upper end so that a fishing line 36 may be positioned in this slot and be held firmly thereby. This rod is also itself somewhat resilient.

The rod 33 may be stored in inoperative position as shown in FIGURE 3 by the rod extending generally parallel to and above the base 10 with its gripping end 34 in contact with the base having been moved to this position by rotation of the pin 27 in its bearing. The spring 30 axially slides the pin 27 so as to cause the rod to engage frictionally with the block 11 and therefore it will maintain itself in this stored position. However, a resilient clip 37 may be provided having a bulge 38 beneath which bulge the rod may be located when in this stored position to additionally hold the rod stored.

For use it is merely necessary to grasp the rod and swing it upwardly about the axial center of the pin 27 in the bearing 26 and as the rod is swung upwardly the pin 27 will slide in the bearing 26 under action of spring 30 so as to move the resilient arm 31 into a position to engage the end of the battery 17, as seen in FIGURE 1, and establish an electrical connection through this resilient metal arm from the end of the battery to the bracket and the metal rod 33. However, the spring of this arm 31 will hold the rod 33 away from the battery case 14 as shown in FIGURE 2 in full lines which will be its normal position of operation. However, should the fish pull on the line 36, then the rod 33 will swing against the tension of the spring arm 31 into the dotted line position shown at 33' in FIGURE 2 so as to establish an electrical connection from the end of the battery to the metal case 14 thus closing the circuit to the lamp which it will be assumed has had the switch 19 in a position to close a circuit so that the lamp will light.

I claim:

1. A night fishing signal device for use with a flashlight unit of the type having casing providing a battery chamber, a lamp at one end thereof, batteries in said chamber, a closure cap for the casing at the other end of the chamber and circuit means including the batteries, lamp, casing and cap but with the cap removed, comprising a base, means on the base to hold a flashlight unit of the above type, circuit control means to operate in the unit circuit in place of the cap thereof comprising a bracket upstanding from the base, a rod, means to mount the rod on the bracket spaced from the battery casing, said rod being movable into engagement with the casing, means having electrical connection with said rod to extend through the open end of a unit casing and engage the batteries therein and electrically connect said rod to the batteries and means on the rod to engage a fishing line so that pull on the fishing line will move the rod into engagement with the casing and complete a circuit from the battery to the casing.

2. A signal device for use in connection with night fishing comprising a base, a flashlight on said base and having an electrically conducting casing with batteries therein, said casing being open at one end to expose said batteries, and a lamp in an electrical circuit with said casing and batteries, means for closing the circuit between said batteries and lamp comprising a metallic rod, a bracket on said base, means to mount said rod on said bracket, means on said rod to attach a fishing line thereto, a resilient arm engaging a terminal of said batteries through the open end of said casing and electrically connected to said rod urging said rod away from said casing, said rod being mounted for movement into engagement with said casing upon pull of the fishing line attached to the rod to complete an electrical circuit and light said lamp.

3. A signal device as in claim 1 wherein said rod is connected in said circuit by a resilient arm which urges said rod away from the part of the flashlight with which if engaged the circuit would be completed.

4. A signal device as in claim 1 wherein the mounting for said rod comprises a pin rotatable about its axis in a bearing and said rod is mounted therein to extend radially therefrom.

5. A signal device as in claim 1 wherein the mounting for said rod comprises a pin rotatable about its axis in a bearing and said rod is mounted therein to extend radially therefrom and a resilient arm engaging the battery is carried by said pin to rotate the rod about its axis.

References Cited in the file of this patent

UNITED STATES PATENTS

| | | |
|---|---|---|
| 963,654 | Schindler | July 5, 1910 |
| 2,490,669 | Burke | Dec. 6, 1949 |
| 2,619,559 | Schenkel | Nov. 25, 1952 |
| 2,948,076 | Patricello | Aug. 9, 1960 |